April 22, 1941.　　　　A. RUDOLF　　　　2,239,251
ELECTRIC BATTERY
Filed Dec. 3, 1938
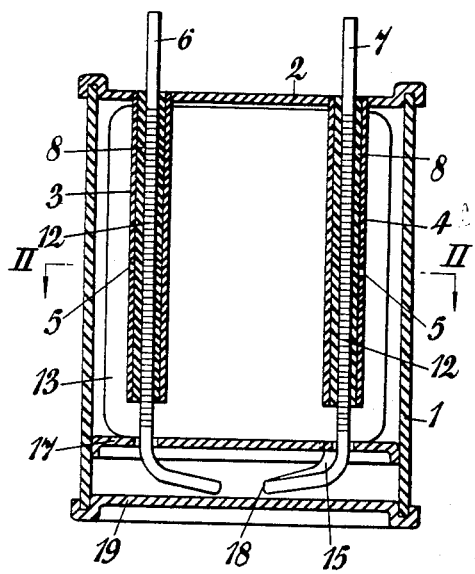
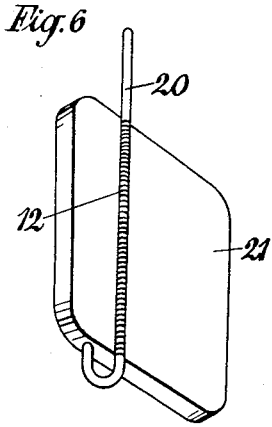
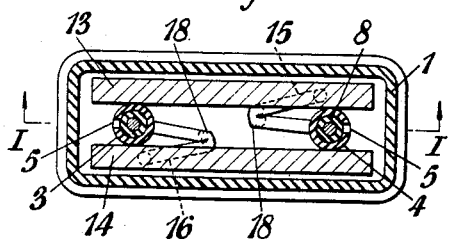
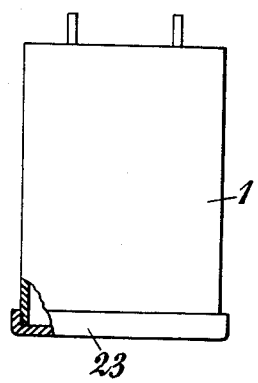
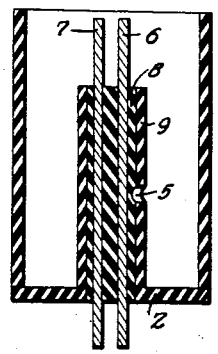
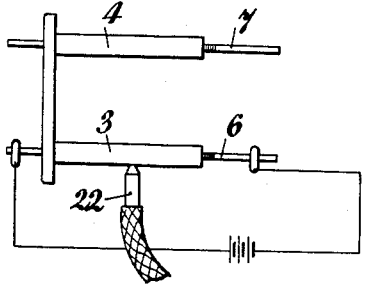
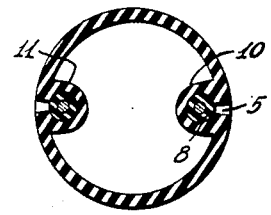
INVENTOR:
Artur Rudolf,
By Smith, Michael & Gardiner,
Attorneys.

Patented Apr. 22, 1941

2,239,251

UNITED STATES PATENT OFFICE 2,239,251

ELECTRIC BATTERY

Artur Rudolf, Sonneberg, Thuringia, Germany, assignor to The Rulag Battery Company Limited, London, England Application December 3, 1938, Serial No. 243,846
In Germany December 14, 1937

1 Claim. (Cl. 136—6)

The present invention is for improvements in or relating to electric lead cells of the type having a casing arranged to hold an electrolyte, at least one positive and one negative electrode arranged within said casing and at least one conductor for the positive electrode or electrodes and at least one corresponding conductor for the negative electrode or electrodes each arranged to extend externally and internally of the said casing and form the electrical connections for said positive and negative electrodes.

In electric lead cells of the above type, the difficulty is often experienced in ensuring that the said conductors, as they extend through a wall or lid of the cell, form a joint which during the life of the cell prevents the electrolyte creeping through to the external terminal.

One method hitherto employed for sealing a conductor into the open end of a cell consisted in moulding around the terminals thereon, an insulating material which subsequently hardened. Such a method can, however, only be employed if the cell consists of rigid material to which the insulating material will adhere firmly. Moreover, the thickness of the insulating material must be considerable, at least where it surrounds the conductor, and this increased thickness adds considerably to the dimensions of the cell.

Such a method as is outlined above could not, even if it were effective, be conveniently employed in the case of small lead cells, for example, lead cells for use in pocket lamps, where it is absolutely essential that any escape of electrolyte should be completely eliminated and where the dimensions of the cell must be kept as near as possible within practicable limits to the actual dimensions of the electrodes.

According to the present invention, there is provided a lead cell of the type referred to, wherein at least one sleeve sealed in a liquid tight manner in one wall of the casing extends into the casing a distance greater than the distance from the internal surface of the said wall to the adjacent edges of the electrodes and permits at least one of the said conductors to extend from the interior to the exterior of the said casing and a caulking is inserted into the said sleeve and prevents any electrolyte from creeping from the interior to the exterior of the casing by way of said conductor.

With such an arrangement, chemical action can proceed only from those portions of the conductor which are located inside the cell and are not covered by the protective material. Since a portion of the conductor must be soldered or otherwise secured to the electrode, it will be inconvenient to protect the conductor over its entire length, but the length of protected conductor can be so chosen without having to increase the size of the casing, that it is practically impossible for chemical action to proceed during the life of the cell under the protective covering for a sufficient distance to reach the exterior of the casing.

The invention will be more particularly described with reference to the accompanying drawing, in which:

Figure 1 illustrates a vertical section on the line I—I of Figure 2 and on an enlarged scale of a battery for a pocket lamp constructed in accordance with the present invention;

Figure 2 illustrates a plan of Figure 1 in section on the line II—II of Figure 1;

Figure 3 illustrates a vertical section of part of a battery constructed in accordance with the present invention wherein two electrode conductors are housed in the same sleeve;

Figure 4 illustrates a cross-sectional plan view of a battery of circular cross section with the sleeves formed integral with the battery casing;

Figure 5 illustrates on an enlarged scale a portion of a conductor employed as the connection between an electrode and the exterior of the battery casing;

Figure 6 illustrates an electrode having a conductor formed integral therewith;

Figure 7 illustrates a cylindrical cell having a closure member in the form of a screw cap; and Figure 8 illustrates diagrammatically a method of manufacturing cells in accordance with the invention.

The invention consists of a battery comprising a rectangular Celluloid shell 1 having an end Celluloid wall 2 secured to the shell by means of an adhesive in such a manner as to render a gas tight union between the shell 1 and the wall 2.

Prior to securing one end wall 2 in position, there are introduced through two holes therein, two tubular Celluloid sleeves 3 and 4 which are arranged to extend into the shell for the major portion of its length. The Celluloid sleeves 3 and 4 are secured to the wall 2 so as to form a liquid tight joint therewith and are provided at points along their lengths with apertures 5. Prior to securing the end wall 2 to the shell 1 conductors 6 and 7 are threaded through the sleeves 3 and 4 and caulking material 8 is introduced into the sleeves, preferably under pressure, through the apertures 5 so that the conductors 6 and 7 are secured in the sleeves in a liquid tight manner. The end wall 2 in which the two sleeves 3 and 4 are sealed is then cemented to the side walls of the shell so as to form a liquid tight joint therewith and convert the shell into an open ended cup shaped member. The cup shaped member formed by the shell 1 and the end wall 2 in which are sealed the two sleeves 3 and 4 is thereupon filled with an electrolyte and positive and negative electrodes 13 and 14 which are preferably constructed in accordance with the invention claimed in United Kingdom Patent No. 407,723, are introduced into the said cup shaped member so that two extensions 15 and 16 which are secured to or formed integral with the electrodes 13 and 14 extend from the open end of the cup shaped member and are connected to the ends of the conductors 6 and 7 which are remote from the end wall 2 of the shell. Prior to connecting the conductors 6 and 7 to the extensions 15 and 16 of the electrodes 13 and 14 a second end cover 17 formed of a piece of Celluloid and having four holes therein is threaded over the two free ends of the conductors 6 and 7 and the extensions 15 and 16 of the electrodes, and is thereupon inserted and if desired cemented to the side walls of the shell 1. The extensions 15 and 16 of the electrodes and the two conductors 6 and 7 are connected to one another by means of lead burning at 18. The portions of the conductors so united are usually made of such a length that their free ends extend beyond the open end of the cup shaped member and, therefore, after they have been connected together the joined ends have to be pressed into the false end between the cover and the open end of the said member before the open end of the member can be sealed by a final end cover 19 which is cemented upon the open end thereof so as to form the true bottom of the finished casing.

It will be appreciated that with the constructions outlined above each of the conductors 6 and 7 is formed of a length equal approximately to the length of one of the electrodes and is arranged from the point of connection of the conductor to the corresponding electrode so that the major portion of the conductor extends through the mass of the electrolyte which envelops the electrodes but is arranged out of contact with the electrolyte by the caulking material 8 arranged to protect each conductor against the action of the electrolyte from the point where the protection of the conductor commences to the point where the conductor extends externally of the casing 1 through the end cover 2 in which it is secured.

Preferably, at least one of the said sleeves 3 and 4 is arranged between two adjacent positive and negative electrodes so as to constitute the separator therefor.

It will be understood that the above merely consists of one method of carrying the invention into effect which may be varied without extending beyond the scope of the appended claim, for example, the conductors 6 and 7 instead of being connected to extensions 15 and 16 of the electrodes 13 and 14 may, as illustrated in Figure 6, be formed in one with the electrode in which case the conductors will be threaded up through the sleeves 3 and 4 and secured in the sleeves by caulking. In Figure 6 a conductor 20 is illustrated integral with an electrode 21.

It is preferable to use a caulking material having a low melting point particularly when the space between the sleeve and the conductor is small and under such circumstances it will be appreciated that the necessary rigidity is provided by the sleeve. If desired the conductor may be heated, for example, electrically as the caulking material is being inserted through the aperture 5 into the sleeves in a softened condition under pressure. Such an arrangement is diagrammatically illustrated in Figure 8, in which the conductor 6 is illustrated being heated by connection to a source of current whilst caulking material is introduced into the sleeve 3 through a nozzle 22. It is to be appreciated that the caulking material need not be in any way dependent upon the material of the shell or the sleeve as is the case with some known methods of sealing. If the material has a low melting point it will be appreciated that it can be employed with materials of an inflammable nature and thus increases the range of materials from which the shell of the battery can be made.

From Figure 3 of the accompanying drawing, it will be appreciated that only one sleeve 9 may be employed for the two conductors 6 and 7 in which case the conductors are separated and secured within the sleeve by the caulking material 8.

Further it will be observed from Figure 4 that if necessary sleeves 10 and 11 may be formed integral with the shell, the conductors 6 and 7 being secured in position in the sleeves by means of the caulking material 8. The shell may be cylindrical in shape and the apertures 5 are preferably made in the exterior wall of the shell as shown.

As illustrated on an enlarged scale in Figure 5 the conductors 6 and 7 are preferably formed with circular scorings 12 which, when the caulking material is forced under pressure into the sleeves, receive the caulking material and so interrupt or materially increase the path of any electrolyte which tends to rise along the conductor.

In the case of a cylindrical lead cell, as illustrated in Figure 7, the closure member may be in the form of a screw cap 23 which possesses advantages from the point of view of manufacture and maintenance, which will be readily appreciated by one skilled in the art. It will be appreciated that in order to retain the advantage of a screw cap only the end of the shell need be cylindrical in shape.

What I claim as my invention and desire to secure by Letters Patent of the United States is:

An electric lead cell comprising a liquid-tight casing including top and bottom walls; positive and negative plate electrodes enclosed within said casing and each extending substantially from the top wall to the bottom wall of said casing in substantially parallel, spaced relation; an electrolyte composition enclosed within said casing in contact with the electrodes therein; a pair of spaced elongated conductors within the casing, each having its lower end connected to one of the electrodes near the bottom thereof from which it extends upwardly through the electrolyte-occupied space of the casing and through the top wall of the casing, each conductor having its surface for a substantial part of the length thereof provided with a plurality of closely-spaced, non-intercommunicating grooves disposed transversely of the length of the conductor so as in effect to extend the lineal superficial length of the conductor from the point at which it is connected to the electrode to the point where it passes through the top wall of the casing; a pair of sleeves formed of insulating material having their upper ends secured to the top wall of the casing in spaced relation by liquid-tight joints, each sleeve extending downwardly between and in contact with the opposed faces of the positive and negative plate electrodes, through the electrolyte-occupied space in the casing and terminating adjacent the bottom wall of the casing, each of said sleeves surrounding and spaced from one of said conductors throughout the greater part of the length of said conductor; and caulking material filling the interior of each sleeve between the wall thereof and the grooved surface of the conductor, the length of said conductors and sleeves, the non-intercommunicating grooves on the surfaces of said conductors, and the said caulking material serving to seal the surfaces of the conductors against creepage of the electrolyte therealong to points outside the casing, said sleeves serving as spacing means between the positive and negative plate electrodes.

ARTUR RUDOLF.